United States Patent [19]

Mausner et al.

[11] Patent Number: 5,713,322

[45] Date of Patent: Feb. 3, 1998

[54] INTAKE PIPE

[75] Inventors: Eberhard Mausner, Bad Soden; Reiner Weingärtner, Hofheim; Manfred Pfalzgraf; Matthias Zentgraf, both of Frankfurt, all of Germany

[73] Assignee: VDO Adolf Schindling AG, Frankfurt, Germany

[21] Appl. No.: 517,176

[22] Filed: Aug. 18, 1995

[30] Foreign Application Priority Data

Aug. 26, 1994 [DE] Germany ............... 44 30 324.6

[51] Int. Cl.[6] .................. F02D 9/08; F02M 35/10; B60K 26/00
[52] U.S. Cl. ................................ 123/184.21
[58] Field of Search ............... 123/184.21, 41.31, 123/41.56, 41.55, 488, 494, 198 E; 73/118.2, 3

[56] References Cited

U.S. PATENT DOCUMENTS

| | | | |
|---|---|---|---|
| 3,996,914 | 12/1976 | Crall et al. | 123/198 E |
| 4,264,961 | 4/1981 | Nishimura et al. | 123/494 |
| 4,561,396 | 12/1985 | Sakamoto et al. | 123/198 E |
| 4,719,891 | 1/1988 | Porth et al. | 123/198 E |
| 4,986,244 | 1/1991 | Kobayashi et al. | 123/488 |
| 5,207,186 | 5/1993 | Okita | 123/41.31 |

FOREIGN PATENT DOCUMENTS 3405935  8/1985  Germany.

*Primary Examiner*—Marguerite McMahon
*Attorney, Agent, or Firm*—Martin A. Farber

[57] ABSTRACT

On an intake pipe (1) developed for an internal combustion engine of a motor vehicle which leads to an air filter housing (3), there is arranged on the outside on the intake pipe (1) a housing (11) containing an engine-control electronics. The housing (11) has a bottom (13) which is cooled by the stream of air in the intake pipe (1). In this way, despite the great closeness of the internal combustion engine, sufficient cooling is obtained of the electronic structural parts of the engine-control electronics.

9 Claims, 2 Drawing Sheets

INTAKE PIPE

FIELD AND BACKGROUND OF THE INVENTION

The present invention relates to an intake pipe which is developed for an internal combustion engine of a motor vehicle and leads to an air-filter housing.

In internal combustion engines of modern motor vehicles, intake manifolds customarily extend from the individual cylinders to an air distributor pipe which is connected with the air-filter housing by an intake pipe. For the management of the engine there is an engine-control electronics which is connected by electric cable to the air-supply sensor, the throttle-valve adjuster, and other devices. Since the engine-control electronics must be protected from excessive heating, and since, due to loss of power, structural parts which produce heat which must be led away, are arranged in the electronics, the housing, together with the engine-control electronics, is arranged at a large distance from the internal combustion engine. Generally this housing is fastened on the radiator tank which shuts the engine compartment off from the windshield wiper, the splash board, or some other part of the body.

This arrangement has the disadvantage that relatively long cables from the individual structural parts which are to be connected to it extend to the engine-control electronics and are to be connected by plugs to the engine-control electronics. The laying of such lines in the engine compartment is time-consuming and expensive. The required plug connections can be the cause of malfunctions of the engine-control electronics due to corrosion or other defects.

SUMMARY OF THE INVENTION

An object of the invention is to develop an intake pipe by which long electric connection between the engine-control electronics and electric or electronic devices arranged in the intake pipe are avoided, and thermal overloading of the engine control electronics is prevented.

This object is achieved in accordance with the invention in the manner that, on the outside, there is arranged a housing having an engine-control electronics which has a bottom which is cooled by the stream of air in the intake pipe.

With such an intake pipe, the engine-control electronics is arranged, contrary to the previous practice, in the direct vicinity of the internal combustion engine. However, the previously constantly feared, impermissible heating of the engine-control electronics when arranged close to the internal combustion engine is not present however with the arrangement in accordance with the invention of the engine-control electronics on the intake. This benefit is obtained because the flow of air in the intake pipe cools the bottom of the housing of the engine-control electronics and thereby discharges both loss-power heat produced by the electronic structural parts and the heat given off by the internal combustion engine which enters into the housing of the engine-control electronics. The arrangement of the engine-control electronics close to the engine does away with longer electrical connections from devices arranged in the vicinity of the internal combustion engine to the engine-control electronics. The invention avoids the corresponding expense for mounting. Furthermore, expense is saved in the manner that the intake pipe and the engine-control electronics are combined into a single structural unit.

The cooling of the engine-control electronics is particularly effective if, in accordance with one advantageous further development of the invention, the bottom of the housing of the engine-control electronics is developed as a bottom plate of metal which is in direct contact with the wall of the intake pipe. Such a bottom plate is preferably made of aluminum or magnesium. It is, of course, also possible for the entire housing of the engine-control electronics to be made of metal.

The heat flow between the heat plate and the circuit board is not prevented by a intervening layer of air if a circuit board is laminated onto the bottom which is developed as a bottom plate of metal. By the use of planar technique, the result is furthermore obtained that the engine-control electronics is less sensitive to oscillation than the hybrid technique previously employed.

The air flowing within the intake pipe has direct contact with the bottom plate if a partial region of the housing at the same time forms a partial region of the wall of the intake pipe. Such an embodiment can be produced at particularly low cost and leads to particularly good cooling, since the heat from the bottom plate need no longer flow through the wall of the intake pipe, generally consisting of plastic, to the air flowing in the intake pipe.

There is advantage from a structural standpoint an embodiment in accordance with which the intake pipe has a wall region which is of trough shape in cross section in the region of the engine-control electronics, said region of the wall being covered off from the outside by the bottom of the housing of the engine-control electronics which is developed as bottom plate.

An air-mass sensor is generally present in the intake pipe of modern motor vehicles having an injection system. Electric lines from this air-mass sensor to the engine-control electronics and the plug for the detachable connection to the engine-control electronics are entirely done away with if, in accordance with one particularly advantageous further development of the invention, an air-mass sensor is fastened in the bottom of the housing of the engine-control electronics.

Ordinarily, the air-mass sensor is an independent structural part having a sensor electronic system which has a voltage stabilizer and an electronic storage. The arrangement of these electronic structural parts is substantially reduced in cost if the air-mass sensor has a sensor electronic system which is arranged on a circuit board of the engine-control electronics. By this arrangement, furthermore, a voltage stabilizer for the air-mass sensor can be done away with.

Air-mass sensors are calibrated at the present time at relatively high expense. This expense can be substantially reduced if a sensor correction program for the calibrating of the air-mass sensor is stored in an electronic memory which is necessary in the housing for the engine control. In this way, deviations of the characteristic curve of the air-mass sensor can be tolerated. It is therefore no longer necessary to calibrate the sensor itself, but the characteristic curve which is different from the ideal characteristic curve of the air-mass sensor is taken into account in the engine-control electronics by the sensor-correction program.

For the requirements in a motor vehicle it is sufficient if the sensor correction program is developed for displacement of the sensor characteristic curve on the basis of two measurements of the air-mass flow and the sensor voltage resulting thereby.

For the further lowering of the manufacturing and mounting expenses it is helpful if the housing of the engine-control electronics forms a single structural unit with a throttle-valve adjuster.

It is optimal for the supplying of the most comprehensive possible, highly functional structural units, as is desired in modern motor vehicle manufacture, if the intake pipe together with an air filter box, the housing containing the engine-control electronics, the air-mass sensor, the throttle valve together with the throttle-valve adjuster, an injection strip with injection valves, an air distributor pipe, and individual intake manifolds each leading to a cylinder, form an intake module as structural unit.

BRIEF DESCRIPTION OF THE DRAWING

With the above and other objects and other advantages in view, the present invention will become more clearly understood in connection with the detailed description of a preferred embodiment, when considered with the accompanying drawing of which.

DETAILED DESCRIPTION OF THE PREFERRED EMBODIMENT

Figure 1:
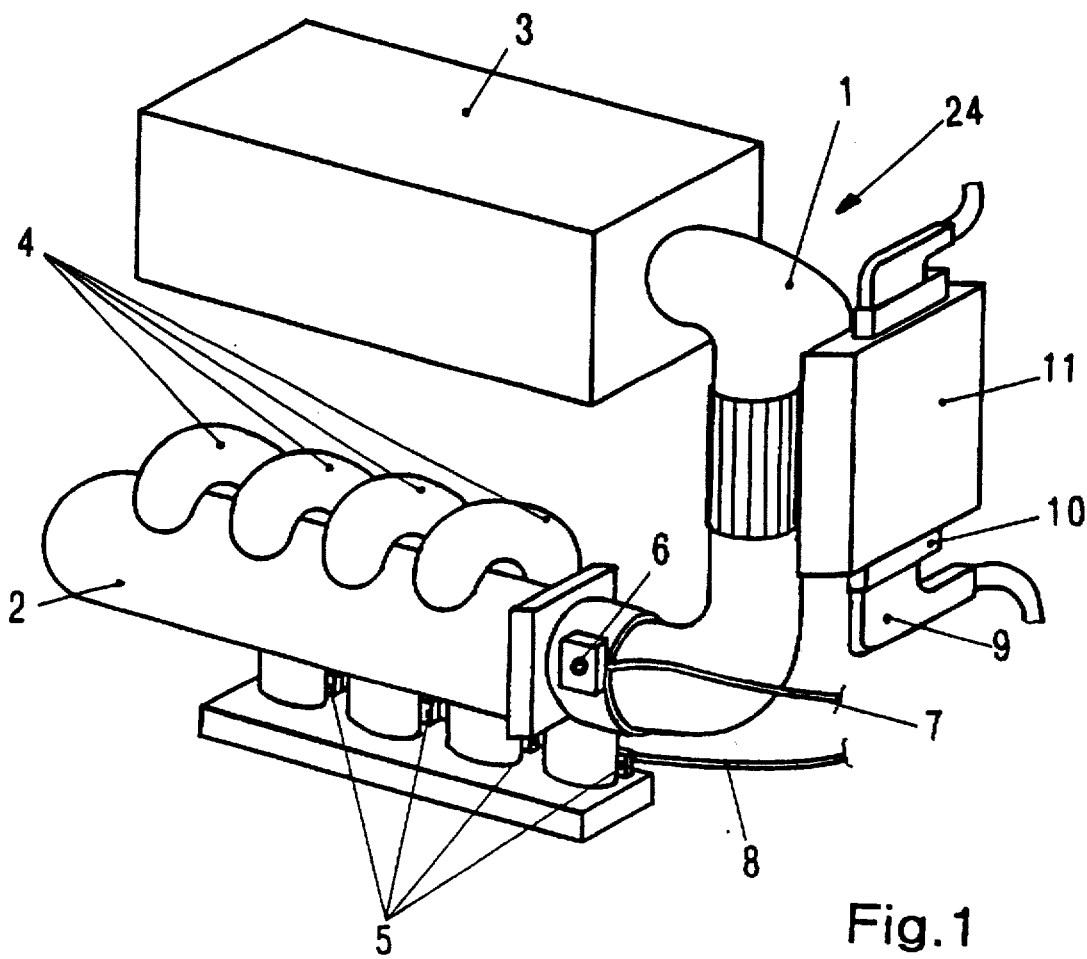
FIG. 1 is a perspective view of an intake pipe in accordance with the invention, together with the adjoining structural parts of an internal combustion engine.

FIG. 1 shows an intake pipe 1 which connects an air-distributor pipe 2 to an air-filter box 3. From the air-distributor pipe 2, intake manifolds 4 lead, in customary manner, to the cylinders (not shown) of an internal combustion engine. Injection valves 5, each of which injects fuel into the intake manifolds 4, are shown in FIG. 1.

Figure 2:
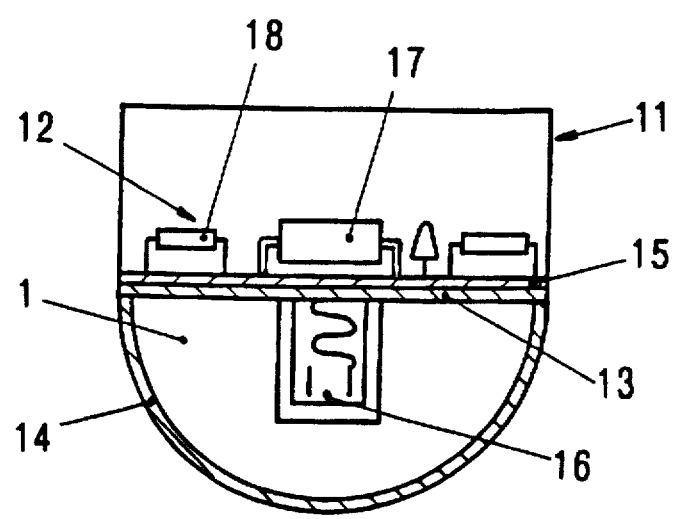
FIG. 2 is a cross section through the intake pipe in the region of a housing of an engine-control electronics.

At the lower end of the intake pipe 1 there can be noted a throttle-valve adjuster 6 having an electric connection 7. This connection 7, as well as an electric connection 8 coming from the injection valves 5 leads to an engine connection plug 9 which is plugged into a receptacle 10 in a housing 11. Within this housing, an engine-control electronics 12 shown in FIG. 2 is arranged. It can be noted form FIG. 1 that the housing 11 is arranged on the intake pipe 1.

The sectional view of FIG. 2 shows that the housing 11 has a bottom 13 which is developed as metal plate, preferably of aluminum of magnesium. This bottom 13 forms a part of a wall 14 of the intake pipe 1. On the bottom 13 there is laminated circuit board 15, for instance by bonding, it bearing the engine-control electronics 12. From the bottom 13, an air-mass sensor 16 extends into the intake pipe 1, so that the latter is connected to the engine-control electronics 12 without any lines which extend to the outside. A sensor electronic system 17 which is ordinarily arranged on the air-mass sensor 16 is, in this embodiment, arranged together with the engine-control electronics 12 on the circuit board 15. The engine-control electronics 12 has an electronic storage 18 in which a sensor correction program can be stored.

In the embodiment shown in FIG. 2, the housing 11 is seated on the outside of the intake pipe 1 so that the heat from the engine-control electronics 12 must pass through the bottom 13 of the housing 11 and the wall 14 of the intake pipe 1 into the stream of air which flows in it.

Figure 3:
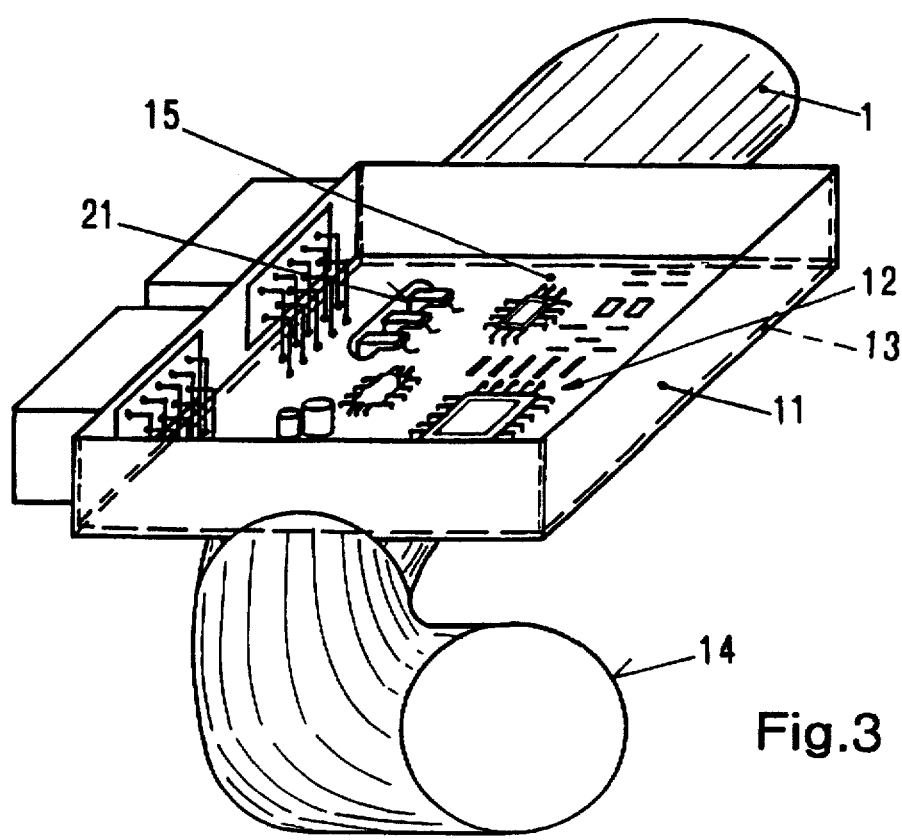
FIG. 3 is a perspective view of the intake pipe with the housing of the engine-control electronics still open.
Figure 4:
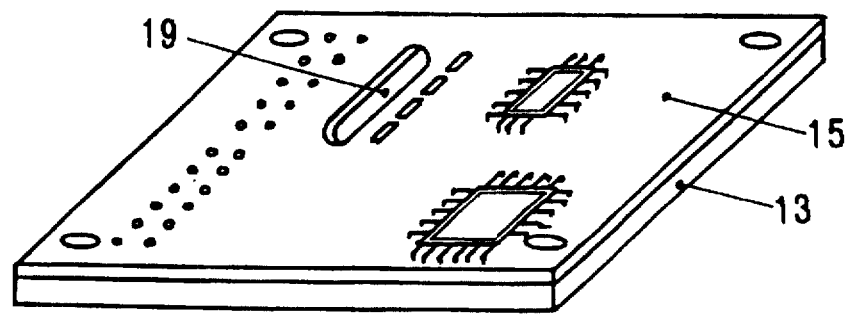
FIG. 4 shows the bottom of the housing with the circuit board and an air-mass sensor.
Figure 4:
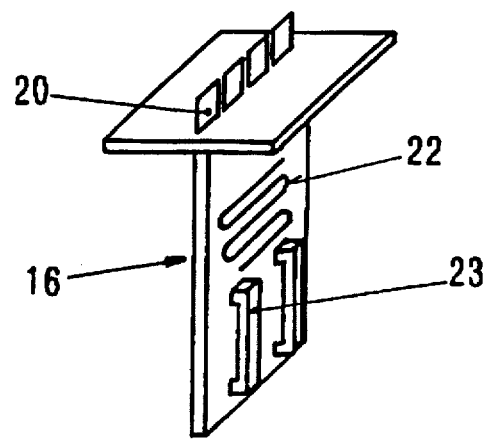

FIG. 3 shows that in the bottom 13 and the circuit board 15 there is provided a lengthwise opening 19 through which the contact tabs 20 of the air-mass sensor 16 can extend, so that they can be connected by solder connections 21 shown in FIG. 2 to conductors (not shown) on the circuit board 15. Measurement wires 22, 23 of the air-mass sensor 16 have also been positioned in FIG. 3. This air-mass sensor 16 operates in the manner that these measurement wires 22, 23 are cooled differently upon a different flow of air in the intake pipe 1 and the electric resistance of these measurement wires 22, 23 changes in this way.

We claim:

1. An intake pipe assembly for an internal combustion engine of a motor vehicle, the pipe extending to an air filter housing of the engine, the assembly comprising:

a housing on the outside of the pipe;

an engine control electronics disposed in the housing;

an air-mass sensor disposed in the bottom of the housing of the engine-control electronics;

wherein the housing has a bottom forming a part of the pipe and being cooled by air flow in the pipe; and the electronics comprises a circuit board, and the air-mass sensor has a sensor electronic system which is arranged on the circuit board, and the air mass sensor is directly connected to the circuit board to form therewith a unitary assembly.

2. An intake pipe assembly according to claim 1, wherein the bottom of the housing of the engine-control electronics comprises a bottom plate of metal which is in direct contact with a wall of the intake pipe.

3. An intake pipe assembly according to claim 2, wherein the circuit board is laminated onto the housing bottom.

4. An intake pipe according to claim 2, wherein a partial region of the housing also forms a partial region of the wall of the intake pipe.

5. An intake pipe assembly according to claim 4, wherein the intake pipe, in a region of the engine-control electronics, has a wall region of trough shape in cross section, the wall region being closed off from the outside by the bottom of the housing.

6. An intake pipe assembly according to claim 1, wherein the electronics further comprises a storage storing a sensor correction program for calibrating the air-mass sensor.

7. An intake pipe assembly according to claim 6, wherein the sensor correction program provides for a displacement of the sensor characteristic curve based on two measurements of the air-mass flow and a voltage of the sensor corresponding to the two measurements of the air mass flow.

8. An intake pipe assembly according to claim 1, further comprising a throttle-valve adjuster, wherein the housing of the engine-control electronics forms a structural unit with the throttle-valve adjuster.

9. An intake pipe assembly according to claim 1, further comprising an air filter box connected to the pipe, a throttle valve within the pipe, an adjuster of the throttle valve, an injection ledge with injection valves for the engine, and an air distributor pipe and intake manifolds connecting with the intake pipe for distributing air among cylinders of the invention;

wherein, together with the air filter box, the housing containing the engine-control electronics with its circuit board, the air-mass sensor, the throttle valve with the throttle-valve adjuster, the injection ledge with injection valves, and the air distributor pipe with individual intake manifolds each leading to a cylinder, form an intake module as structural unit.

\* \* \* \* \*